(12) United States Patent
Hoerr (10) Patent No.: US 11,276,198 B2
(45) Date of Patent: Mar. 15, 2022

(54) APPARATUS FOR DETERMINING DIMENSIONAL AND GEOMETRIC PROPERTIES OF A MEASUREMENT OBJECT

(71) Applicant: Carl Zeiss Industrielle Messtechnik GmbH, Oberkochen (DE)

(72) Inventor: Christian Hoerr, Flintsbach (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 27 days.

(21) Appl. No.: 16/788,170

(22) Filed: Feb. 11, 2020

(65) Prior Publication Data
US 2020/0286258 A1 Sep. 10, 2020

(30) Foreign Application Priority Data
Feb. 12, 2019 (DE) ...................... 10 2019 103 519.8

(51) Int. Cl.
*G06T 7/11* (2017.01)
*G06T 7/73* (2017.01)
(Continued)

(52) U.S. Cl.
CPC ............. *G06T 7/74* (2017.01); *G01B 11/002* (2013.01); *G01B 11/005* (2013.01);
(Continued)

(58) Field of Classification Search
CPC ................ G01B 11/2513; G01B 11/25; G01B 11/2545; G01B 21/042; G01B 11/245;
(Continued)

(56) References Cited

U.S. PATENT DOCUMENTS

| | | | |
|---|---|---|---|
| 6,611,617 B1 | 8/2003 | Crampton | |
| 6,868,194 B2 * | 3/2005 | Tu ......................... | G01B 11/25 382/312 |

(Continued)

FOREIGN PATENT DOCUMENTS

| | | |
|---|---|---|
| DE | 10 2010 007 396 A1 | 8/2011 |
| DE | 10 2015 203 396 A1 | 8/2016 |

(Continued)

OTHER PUBLICATIONS

Woodham; Photometric Method for Determining Surface Orientation from Multiple Images; published in Optical Engineering, 19(1); 1980; 7 pages.
Diego Nehab et al.; Efficiently Combining Positions and Normals for Precise 3D Geometry; ACM Transactions on Graphics (Proc. of ACM Siggraph 2005); 8 pages.
(Continued)

*Primary Examiner* — Michael P Stafira
(74) *Attorney, Agent, or Firm* — Miller Johnson (57) ABSTRACT

An apparatus for determining at least one of dimensional and geometric properties of a measurement object has a first measurement arrangement, which records first measurement values. The first measurement values represent respective positions of first selected measurement points relative to a first coordinate system. The apparatus has a second measurement arrangement, which records second measurement values. The second measurement values represent respective surface normals at second selected measurement points. The first and second measurement arrangements are arranged spatially fixedly with respect to one another on a housing body. The apparatus further has a third measurement arrangement, which records third measurement values. The third measurement values represent a respective current position of the housing body relative to a further coordinate system. The evaluation unit is configured to combine the
(Continued)

first measurement values and the second measurement values positionally correctly using the third measurement values.

17 Claims, 2 Drawing Sheets (51) Int. Cl.
*G01B 11/25* (2006.01)
*G06T 7/00* (2017.01)
*G06T 7/60* (2017.01)
*G01B 11/00* (2006.01)

(52) U.S. Cl.
CPC ...... *G01B 11/2518* (2013.01); *G01B 11/2522* (2013.01); *G06T 7/001* (2013.01); *G06T 7/11* (2017.01); *G06T 7/60* (2013.01)

(58) Field of Classification Search
CPC .............. G01B 11/2518; G01B 11/002; G01B 11/22; G01B 11/2527; G01B 11/005; G01B 2210/52; G01B 5/004; G01B 11/14; G01B 11/2536; G01B 11/03; G01B 11/24; G01B 11/2504; G01B 11/303; G01B 11/00; G01B 11/02; G01B 11/2509; G01B 11/2522; G01B 11/254; G01B 11/30; G01B 11/306; G01B 2210/54; G01B 9/0201; G01B 5/008; G01B 5/012; G01B 11/27; G01B 2210/58; G01B 21/047; G01B 11/026; G01B 11/2531; G01B 21/045; G01B 11/007; G01B 5/0014; G01B 11/255; G01B 10/60; G01B 3/30; G01B 7/30; G01B 11/022; G01B 11/028; G01B 11/0608; G01B 11/2441; G01B 11/26; G01B 5/0004; G06T 7/521; G06T 7/50; G06T 7/60; G06T 7/579; G06T 17/00; G06T 19/20; G06T 2207/10004; G06T 2207/10028; G06T 2207/10024; G06T 2207/30244; G06T 7/0012; G06T 7/73; G06T 7/80; G06T 15/06; G06T 15/506; G06T 19/006; G06T 2207/30204; G06T 7/33; G06T 7/586; G06T 15/08; G06T 15/205; G06T 15/50; G06T 15/55; G06T 15/80; G06T 19/00; G06T 2200/04; G06T 2207/10152; G06T 2207/30036; G06T 2207/30201; G06T 5/006; G06T 7/00; G06T 7/40; G06T 7/557; G06T 7/596; G06T 7/70; G06T 15/10; G06T 2207/10012; G06T 2207/30104; G06T 2207/30121; G06T 7/0004; G06T 7/514; G06T 7/55; G06T 11/006; G06T 15/005; G06T 1/0007; G06T 1/0014; G06T 2207/10016; G06T 2207/10048; G06T 2207/10148; G06T 2207/20021; G06T 2207/20048; G06T 2207/20056; G06T 2207/20084; G06T 2207/30168; G06T 3/0012; G06T 3/005; G06T 3/0093; G06T 7/0002; G06T 7/0006; G06T 7/001; G06T 7/11; G06T 7/20; G06T 7/571; G06T 7/593; G06T 7/74; G06T 7/90; G06T 2207/10021; G06T 7/248; G06T 7/75; G06T 7/85; G06T 7/13; G06T 2200/24; G06T 2207/30004; G06T 7/251; G06T 7/62; G06T 15/00; G06T 2207/10081; G06T 2207/20068; G06T 2207/30208; G06T 2210/36; G06T 11/60; G06T 17/10; G06T 2207/20228; G06T 7/536; G06T 7/97; G06T 2200/08; G06T 2207/30076; G06T 7/30; G06T 7/344; G06T 7/66; G06T 17/20; G06T 2207/30196; G06T 2210/21; G06T 7/246; G06T 7/337; G06T 9/001; G06T 19/003; G06T 2207/10032; G06T 2207/10088; G06T 2207/20044; G06T 2207/30108; G06T 2207/30212; G06T 2207/30241; G06T 2207/30248; G06T 2207/30252; G06T 7/0014; G06T 7/262; G06T 1/20; G06T 2200/28; G06T 2207/10104; G06T 2207/10136; G06T 2207/30016; G06T 2207/30088; G06T 2207/30164; G06T 2215/16; G06T 2219/024; G06T 2219/028; G06T 2219/20; G06T 5/002; G06T 7/0016; G06T 7/44; G06T 13/40; G06T 15/40; G06T 17/05; G06T 2207/10116; G06T 2207/20081; G06T 2207/20101; G06T 2207/20212; G06T 2207/20224; G06T 2207/30068; G06T 2210/61; G06T 3/40; G06T 3/4007; G06T 5/20; G06T 15/20; G06T 15/503; G06T 15/60; G06T 2207/10068; G06T 2207/20016; G06T 2207/20076; G06T 2207/20221; G06T 2207/30028; G06T 2207/30048; G06T 2219/2021; G06T 3/0031; G06T 5/50; G06T 7/12; G06T 7/174; G06T 7/194; G06T 7/254; G06T 7/285; G06T 9/002; G02B 27/0172; G02B 27/425; G02B 2027/0118; G02B 2027/0127; G02B 2027/0138; G02B 2027/014; G02B 26/06; G02B 26/0816; G02B 27/0012; G02B 27/01; G02B 27/0944; G02B 27/48; G02B 3/02; G02B 3/08; G02B 27/0093; G02B 27/20; G02B 30/50; G02B 3/0056; G02B 5/0278; G02B 19/0066; G02B 1/14; G02B 2003/0093; G02B 2027/0107; G02B 2027/0174; G02B 2027/0178; G02B 21/0028; G02B 21/0032; G02B 21/004; G02B 21/008; G02B 21/0092; G02B 21/365; G02B 21/367; G02B 2207/123; G02B 2207/129; G02B 23/2415; G02B 23/2461; G02B 23/2484; G02B 26/10; G02B 27/0043; G02B 27/0075; G02B 27/017; G02B 27/06; G02B 27/0905; G02B 27/0927; G02B 27/10; G02B 27/1013; G02B 27/106; G02B 27/1086; G02B 27/30; G02B 27/4205; G02B 27/4233; G02B 30/00; G02B 30/33; G02B 30/56; G02B 3/00; G02B 3/0025; G02B 3/0062; G02B 3/04; G02B 3/14; G02B 5/005; G02B 5/045; G02B 5/10; G02B 5/18; G02B 5/1842; G02B 5/3083; G02B 5/32; G02B 6/0023; G02B 6/0025; G02B 6/0031; G02B 6/005; G02B 6/0068; G02B 6/0076; G02B 6/02057; G02B 6/34; G01N 21/57; G01N 21/55; G01N 2021/1776; G01N 2021/3177; G01N 2021/4711; G01N 2021/575; G01N 2021/8829; G01N 2021/8848; G01N 21/251; G01N 21/255; G01N 21/4738; G01N 21/4785; G01N 21/4795; G01N 21/6456; G01N 21/6486;

G01N 21/8422; G01N 21/88; G01N 21/8806; G01N 21/958; G01N 2201/0635; G01J 3/00; G01J 3/0208; G01J 3/14; G01J 3/18; G01J 3/2823; G01J 3/2846; G01J 3/465; G01J 3/504; G01J 3/513

See application file for complete search history.

(56) References Cited

U.S. PATENT DOCUMENTS

| | | | | |
|---|---|---|---|---|
| 9,091,536 | B2 * | 7/2015 | Hausler | G01B 11/2522 |
| 9,163,936 | B1 * | 10/2015 | Ulmer | G01B 11/2513 |
| 2010/0008588 | A1 * | 1/2010 | Feldkhun | G01B 11/2527 |
| | | | | 382/206 |
| 2014/0028805 | A1 * | 1/2014 | Tohme | H04N 13/204 |
| | | | | 348/47 |
| 2014/0081459 | A1 | 3/2014 | Dubois et al. | |
| 2014/0268178 | A1 * | 9/2014 | Atwell | G01C 25/005 |
| | | | | 356/614 |
| 2015/0254819 | A1 * | 9/2015 | Hara | G06T 5/006 |
| | | | | 345/647 |
| 2017/0094251 | A1 * | 3/2017 | Wolke | H04N 13/246 |
| 2019/0056218 | A1 | 2/2019 | Ulmer et al. | |

FOREIGN PATENT DOCUMENTS

| | | | | |
|---|---|---|---|---|
| DE | 102015011427 | A1 * | 3/2017 | G01B 11/2513 |
| DE | 10 2017118767 | A1 | 2/2019 | |
| EP | 3 321 883 | A1 | 5/2018 | |

OTHER PUBLICATIONS

Herbort et al.; 3D range scan enhancement using image-based methods; ISPRS Journal of Photogrammetry and Remote Sensing 84; 2013; 16 pages.

Carl Zeiss Optotechnik GmbH brochure; Zeiss T-Scan—3D digitization/ laser scanning, intuitive data acquisition using a manually guided laser scanner; 2018; 13 pages.

* cited by examiner

APPARATUS FOR DETERMINING DIMENSIONAL AND GEOMETRIC PROPERTIES OF A MEASUREMENT OBJECT

CROSS-REFERENCE TO RELATED APPLICATIONS

This application claims priority to German Patent Application No. DE 10 2019 103 519.8 filed Feb. 12, 2019. The entire disclosure of the application referenced above is incorporated by reference.

FIELD

The present invention relates to an apparatus for determining at least one of dimensional and geometric properties of a measurement object.

BACKGROUND

Determining dimensional and/or geometric properties of objects is a typical objective in industrial metrology. For example, the geometric and/or dimensional properties of an individual workpiece are determined for quality assurance in industrial production processes to check whether the workpiece observes specified tolerances. In the development and design of new products, it is frequently desirable to measure the individual properties of a prototype or of a counterpart that cooperates with the workpiece to be designed. The dimensional and/or geometric properties can include distances between individual features at the workpiece, such as the distance between two edges or the diameter of a hole, but also the complex geometric spatial form of the workpiece. Increasingly, there is a desire to obtain what is known as a 3D scan of a workpiece or a workpiece part. The 3D scan provides a multiplicity of spatial coordinates (3D coordinates), which define the position of numerous measurement points on the workpiece relative to a reference coordinate system and which therefore describe the complex spatial form of the workpiece. The dimensional and/or geometric properties can be determined on the basis of the measured spatial coordinates.

There are various methods for obtaining a 3D scan of a measurement object. By way of example, a probe element can be used to physically touch the desired measurement points, wherein the spatial coordinates of the measurement points are determined from the respective position of the calibrated probe element relative to the reference coordinate system. In addition, there are various non-contact methods for determining the position of measurement points relative to a reference coordinate system. Some methods are based on triangulation, in which the measurement object is recorded with one or more cameras and the evaluation of the camera images is based on trigonometric relationships. In some of these methods, the measurement object is illuminated with a defined pattern, for example in the case of what are known as fringe projection methods. Each method has specific advantages and disadvantages with respect to the apparatus involved and with respect to the size of the measurement volume, the attainable measurement accuracy, measurement speed, inter alia. For example, fringe projection methods are sensitive with respect to image noise and are not suitable for high-gloss surfaces.

A publication by R. J. Woodham entitled "*Photometric Method for Determining Surface Orientation from Multiple Images*," published in Optical Engineering, 19(1), 1980, the entire disclosure of which is incorporated by reference, describes a method by which the respective local inclination of the measurement object surface can be determined at a plurality of measurement points by illuminating the surface successively from different directions. Using a positionally fixed camera, images of the respectively illuminated surface are recorded and what are known as surface normals are determined therefrom. A surface normal is a vector which is perpendicular to the surface and consequently represents the inclination of the surface at that location. The Woodham method is known by the term photometric stereo and is based on the assumption of point-like light sources, situated at infinity, with in each case the same light intensity (directional light source). This assumption cannot be maintained in practice, which results in measurement errors when determining the surface normals.

A publication by Diego Nehab et al. entitled "*Efficiently Combining Positions and Normals for Precise 3D Geometry*," ACM Transactions on Graphics (Proc. of ACM SIGGRAPH 2005), the entire disclosure of which is incorporated by reference, proposes a computational combination of the measurement results from a fringe projection method and from a photometric stereo method. The surface normals of the measurement object can be calculated using the 3D coordinates from the fringe projection method. Conversely, assuming a continuous surface, it is possible, on the basis of the surface normals from photometric stereo, to reconstruct the object surface and 3D coordinates therefrom. Fringe projection methods result in comparatively short-wave/high-frequency measurement errors (with respect to the extent of the surface) in the form of apparently random, high-frequency noise. By contrast, the measurement errors in the case of photometric stereo are comparatively long-wave. Nehab et al. propose to computationally combine the "good" measurement results of the fringe projection method in the long-wave range with the "good" measurement results of the photometric stereo method in the short-wave/high-frequency range. The object surface is thus supposed to be reconstructed in a more detailed and accurate manner than by each of the individual methods.

Fusion of measurement values from a 3D distance measuring device and a photometric stereo method is also proposed in a publication by Steffen Herbort et al. titled "*3D range scan enhancement using image-based methods*," published in ISPRS Journal of Photogrammetry and Remote Sensing 84 (2013), the entire disclosure of which is incorporated by reference.

DE 10 2010 007 396 A1, the entire disclosure of which is incorporated by reference, discloses a method and an apparatus for optically inspecting a measurement object having an at least partly reflective surface in order to determine the local scattering properties of the object surface. In this method, the object surface is sequentially illuminated by light sources at different positions, similar to the photometric stereo method. A camera records a series of images with the different illuminations. Subsequently, an individual light origin region is determined for at least one camera pixel. The light origin region represents the spatial distribution of the individual light contributions produced by the individual light sources over the surface of the measurement object on the at least one pixel. The scattering properties of the surface point recorded by the camera pixel is then determined on the basis of the individual light origin region. A 3D coordinate measurement and a determination of dimensional and/or geometric properties of the measurement object on the basis of the measurement is not envisaged by this method.

DE 10 2015 203 396 A1, the entire disclosure of which is incorporated by reference, discloses an apparatus comprising a first image capture device having a first capture region and a second image capture device having a second capture region, wherein the first capture region and the second capture region at least partly overlap. The apparatus furthermore has at least one light source configured to emit light from different directions of incidence into at least one capture region. The apparatus serves for determining the topography of the surface of a measurement object.

EP 3 321 883 A1, the entire disclosure of which is incorporated by reference, discloses a method and a system for determining the spatial pose of an object with the aid of one or more markers arranged on the object. In one exemplary embodiment, the object is a manually guided tactile measurement tool for recording 3D coordinates on a measurement object. The marker on the measurement tool has an inner region having a circular contour having a known radius and a pattern defining at least one characteristic feature. A camera image of the marker typically shows an elliptic representation of the circular contour and of the pattern. Parameters describing the elliptic representation are determined on the basis of the camera image, and the pose of the marker in space is determined using the parameters.

Finally, a manually guided laser line scanner is known from a brochure from Carl Zeiss Optotechnik GmbH entitled "ZEISS T-SCAN—3D-Digitalisierung/Laserscanning, Intuitive Datenerfassung mit handgeführtem Laserscanner" ("ZEISS T-SCAN—3D digitization/laser scanning, intuitive data acquisition using a manually guided laser scanner"), the entire disclosure of which is incorporated by reference.

SUMMARY

Against this background, it is an object of the present invention to provide an apparatus of the type mentioned in the introduction which makes possible a high measurement speed and/or a high measurement resolution when determining dimensional and/or geometric properties of a measurement object in a cost-effective manner.

In accordance with one aspect of the present invention, there is provided an apparatus for determining at least one of dimensional or geometric properties of a measurement object, comprising a housing body, which is movable relative to the measurement object, comprising a first measurement arrangement arranged on the housing body, wherein the first measurement arrangement defines a first coordinate system and is configured to record first measurement values, comprising a second measurement arrangement arranged on the housing body, wherein the second measurement arrangement which is configured to record second measurement values, comprising a third measurement arrangement, which defines a further coordinate system and is configured to record third measurement values, and comprising an evaluation unit, which is configured to determine the at least one of the dimensional or geometric properties of the measurement object using the first, the second and the third measurement values, wherein the first measurement values represent respective positions of first selected measurement points on the measurement object relative to the first coordinate system, wherein the second measurement values represent respective surface normals to second selected measurement points on the measurement object, wherein the housing body holds the first measurement arrangements and the second measurement arrangement in a spatially fixed relationship with respect to one another, wherein the third measurement values represent a respective current pose of the housing body relative to the further coordinate system, and wherein the evaluation unit is configured to combine the first measurement values and the second measurement values positionally correctly using the third measurement values.

The novel apparatus advantageously uses information from the third measurement arrangement in order to combine the first measurement values from the first measurement arrangement and the second measurement values from the second measurement arrangement positionally correctly. For the case where a selected first measurement point and a selected second measurement point represent one and the same object point on the measurement object, combining "positionally correctly" in particular means that for the object point a final measurement value is determined from the corresponding first measurement value and the corresponding second measurement value. The final measurement value may be determined, by way of example, as a corrected first measurement value by the corresponding second measurement value being used computationally to minimize a systematic measurement error of the first measurement arrangement and/or to reduce the measurement uncertainty. Alternatively, the final measurement value may result from either the first measurement value or the second measurement value being used as the final measurement value, depending on a defined quality criterion. Furthermore, the final measurement value could be determined from the first and second measurement values by averaging, or with the aid of some other compensation criterion. In other words, the "double measurement information" for an object point may advantageously be used to obtain an optimized final measurement value for the corresponding object point which represents the actual position and/or inclination of the object point as well as possible.

By contrast, for the case where a selected first measurement point and a selected second measurement point represent different object points on the measurement object, the corresponding first measurement value and the corresponding second measurement value are advantageously used to obtain a measurement value for each of the two object points. In this case, therefore, taking account of the position of the measured object points relative to one another, the first and second measurement values are fused to form a common measurement result in which the first measurement value represents the first measured object point and the second measurement value represents the second measured object point. "Positionally correctly" thus generally means that the first and second measurement values are fused to form a final measurement data set which characterizes the measurement object as well as possible. In many cases, the combination of the first and second measurement values results in a higher measurement resolution overall and/or in lower measurement uncertainty.

Since the first measurement arrangement and the second measurement arrangement are held spatially fixedly, i.e. rigidly with respect to one another, on the housing body, and since the third measurement values represent a respective current pose of the movable housing body in space, the first measurement values and the second measurement values can be combined positionally correctly even if the first measurement values and the second measurement values were recorded at different instances of time and/or from different directions on the measurement object. Consequently, the requirements in respect of a temporal synchronization of the first and second measurement arrangements are reduced. In particular, camera images of the measurement object can be recorded temporally successively with illuminations from different directions, such as are typically used for a photometric stereo method, without the first measurement arrangement having to be temporally synchronized with the plurality of image recordings.

For this reason, the relative movement of the housing body with the first and second measurement arrangements can advantageously be used to illuminate the measurement object from different directions in order to determine the respective surface normals. The second measurement arrangement can therefore be realized with a small construction and compactly, which facilitates a manually guided measurement by an operator and/or enables faster measurements. Likewise, the higher measurement resolution that is achievable by combining the first and second measurement values can advantageously be used to permit a higher speed of movement when recording the first measurement values.

Overall, the novel apparatus allows to increase the structural resolution and/or the scanning speed in comparison with generic apparatuses from the prior art. Furthermore, the combination of the first and second measurement values can advantageously be used to obtain an increased measurement accuracy. Particularly advantageously, the second measurement values enable a coordinate measurement with subpixel accuracy at points of discontinuity on the measurement object, such as, for instance, at holes or other sharp edges. Therefore, the problem mentioned above is completely achieved.

In a preferred refinement, the first measurement arrangement includes a light pattern projector and a first camera, which is arranged in a defined pose relative to the light pattern projector on the housing body. In preferred exemplary embodiments, the light pattern projector is a laser line projector that projects a laser line having a defined wavelength onto the measurement object. In principle, however, the light pattern projector could also project some other light pattern onto the measurement object, for instance a plurality of parallel lines and/or crossed laser lines, a plurality of light points and/or a plurality of stripes having a varying light intensity.

The refinement uses a first measurement arrangement that operates according to a proven scanner principle and therefore enables a cost-effective realization. In this refinement, the proven measurement arrangement is supplemented by a second measurement arrangement, which yields respective surface normal to the second selected measurement points. The underlying measurement principles are different and advantageously complement one another. In particular, the second measurement arrangement can operate according to the photometric stereo method and the refinement can efficiently use the advantages resulting from the fusion of the two measurement principles, the advantages already having been described in the introduction. The positionally correct fusion of the coordinate measurement values from the first measurement arrangement and the surface normal from the second measurement arrangement is simplified on account of the third measurement values.

In a further refinement, the second measurement arrangement includes a point light source and a second camera, which is arranged in a defined pose relative to the point light source on the housing body.

In preferred exemplary embodiments, the point light source generates light having a wavelength that differs from the wavelength of the light pattern projector of the first measurement arrangement. Advantageously, the first camera has a bandpass filter tuned to the wavelength of the light pattern projector and the second camera has a bandpass filter tuned to the wavelength of the point light source, wherein the two bandpass filters have different pass wavelengths. In these exemplary embodiments, the first measurement values and the second measurement values are effectively decoupled from one another on account of the different wavelengths and bandpass filters, which facilitates the evaluation and enables a higher measurement accuracy. Independently of this, the present refinement enables a very compact and cost-effective realization of the second measurement arrangement with a small number of point light sources. In some exemplary embodiments, the second measurement arrangement has exactly one point light source, which enables a particularly cost-effective and compact realization. In other exemplary embodiments, the second measurement arrangement has two, three, four or five point light sources (preferably fewer than ten and particularly preferably fewer than six), which are advantageously arranged parallel to a laser line of the light pattern projector mentioned above. In this case, the plurality of point light sources enable an increased measurement resolution along the laser line. Generally, the present refinement benefits from the fact that the housing body with the second measurement arrangement is movable relative to the measurement object and this enables different illumination directions toward the measurement object with one or a small number of point light sources in a cost-effective manner.

In a further refinement, the first measurement arrangement and the second measurement arrangement use a common camera.

In this refinement, it is possible to realize the first camera in accordance with the abovementioned refinement of the first measurement arrangement and the second camera in accordance with the abovementioned refinement of the second measurement arrangement with a single camera, which functionally belongs to both the first measurement arrangement and the second measurement arrangement. The configuration enables a particularly compact and cost-effective realization and can benefit in particular from the fact that, on account of the third measurement values, a temporally synchronous recording of the first measurement values and the second measurement values can be dispensed with.

In some exemplary embodiments, the apparatus can be configured to record first and second images of the measurement object alternately, wherein the respective first images include a light pattern generated with the aid of the light pattern projector mentioned above, while the respective second images include an illumination by means of the point light source of the second measurement arrangement. In these exemplary embodiments, the first and second measurement arrangements operate as it were with time division multiplexing. In some preferred exemplary embodiments, the common camera has a depth of field that sharply images both first selected measurement points and second selected measurement points at a measurement time. In a departure from this, the first measurement arrangement and the second measurement arrangement in other refinements can each have a separate camera, the depth of field of which is designed to be different. In particular, the depth of field of the second camera can be greater than the depth of field of the first camera if the latter together with a laser line projector forms the first measurement arrangement.

In a further refinement, the common camera is a color camera.

This refinement enables the first and second measurement values to be recorded separately in a cost-effective manner by the light pattern projector and the point light source using different wavelengths, for example, which can be differentiated from one another on the basis of the light color.

Furthermore, it is generally advantageous if the apparatus has at least one color camera that can be used to determine the color and/or texture of the surface of the measurement object. Generally it is preferred if the at least one color camera is an area camera that yields a 2D image with each image recording.

In a further refinement, the third measurement arrangement is synchronized with the first measurement arrangement and with the second measurement arrangement.

In this refinement, the first measurement values and the third measurement values are recorded temporally synchronously. The second measurement values and the third measurement values are likewise recorded temporally synchronously. Advantageously, the temporally synchronous recording of the first and third measurement values, and respectively of the second and third measurement values, can be realized with the aid of a common trigger signal and/or with the aid of temporally synchronous trigger signals. In some exemplary embodiments, the evaluation unit can generate a system-wide trigger signal that triggers the recording of the measurement values. As an alternative, the first measurement arrangement and the second measurement arrangement can each generate a trigger signal that triggers recording of the third measurement values, or vice versa. The refinements facilitate the positionally correct combination of the first and second measurement values using the third measurement values since a respectively unambiguous time reference is provided in a pairwise manner.

In a further refinement, the first measurement arrangement and the second measurement arrangement record the respective first and second measurement values synchronously with respect to one another.

In some exemplary embodiments of this refinement, the first measurement arrangement can provide a trigger signal for the second measurement arrangement, or vice versa, and the first and second measurement arrangements record the first and second measurement values, respectively, in each case temporally synchronously with respect to the trigger signal. The refinement enables a cost-effective realization with a common trigger signal for the first and second measurement arrangements. Notwithstanding, second measurement values recorded at other trigger times can be combined with the first measurement values positionally correctly on the basis of the third measurement values. In other words, in this refinement, too, the combination of first and second measurement values is not restricted to the temporally synchronously recorded measurement values. The refinement benefits from the advantages mentioned above and additionally makes it possible to use the first and second measurement arrangements in a canonical mode, i.e. in each case by themselves.

In a further refinement, the first measurement arrangement and the second measurement arrangement record the respective first and second measurement values asynchronously with respect to one another.

In this refinement, the first measurement arrangement and the second measurement arrangement operate temporally asynchronously and thus largely independently of one another. The refinement makes it possible to operate the first measurement arrangement and the second measurement arrangement with different exposure times, image recording rates and the like. Nevertheless, the first and second measurement values can be combined positionally correctly on the basis of the third measurement values. The refinement makes it possible to optimize the first and second measurement arrangements to the respective underlying measurement principle and it thus enables a high measurement accuracy in an efficient manner.

In a further refinement, the first measurement arrangement generates the first measurement values with a defined spatial resolution, and the evaluation unit is configured to interpolate first measurement values spaced apart from one another using the second measurement values.

In this refinement, the second and third measurement arrangements advantageously contribute to increasing the measurement resolution of the first measurement arrangement by "filling in" the "gaps" between neighboring first measurement points with second measurement points and corresponding second measurement values. For the same measurement resolution, the refinement enables a higher measurement speed by virtue of the housing body being moved at a higher speed relative to the measurement object. For the same measurement speed, the measurement resolution of the apparatus is increased in this refinement. In some advantageous exemplary embodiments, the apparatus enables an increased measurement speed and an increased measurement resolution in comparison with apparatuses of the generic type. In this refinement, the dimensional and/or geometric properties of the measurement object are advantageously determined using the interpolated first measurement results.

In a further refinement, the evaluation unit is configured to correct selected first measurement values using the second measurement values.

In this refinement, the dimensional and/or geometric properties of the measurement object are determined using the corrected first measurement values. The refinement benefits from the fact that the first measurement arrangement and the second measurement arrangement have mutually different error systematics as a result of their different measurement principles. As already mentioned in the introduction, fringe projection methods regularly result in rather short-wave/high-frequency measurement errors in the form of apparently random, high-frequency noise. In contrast thereto, measurement errors in the case of photometric stereo are comparatively long-wave. A fusion of the "good" first measurement values with the "good" second measurement values therefore enables a higher measurement accuracy overall, particularly in the case of measurement objects having lustrous partial surfaces.

In a further refinement, the measurement object has an object surface having a surface texture, wherein the evaluation unit is configured to determine the surface texture of the measurement object using the second measurement values.

In this refinement, the second measurement arrangement is advantageously used to determine optical and/or haptic properties of the object surface in addition to the positions of the first selected measurement points and the surface normal to the second selected measurement points. In some advantageous exemplary embodiments, the information thus obtained is used to determine operating parameters of the first measurement arrangement depending on the second measurement values, such as, for instance, the size/extent of a projected light pattern, the illumination intensity of a light pattern projector and/or the relative speed of the housing body relative to the measurement object. The refinement makes it possible to operate the first measurement arrangement in an optimal operating mode depending on the surface properties of the measurement object and therefore contributes to increasing the measurement accuracy and/or measurement speed of the apparatus.

It goes without saying that the aforementioned features and those yet to be explained below can be used not only in the combination specified in each case but also in other combinations or on their own, without departing from the scope of the present invention. Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Exemplary embodiments of the invention are illustrated in the drawings and explained in more detail in the following description. In the drawing.

DETAILED DESCRIPTION

Figure 1:
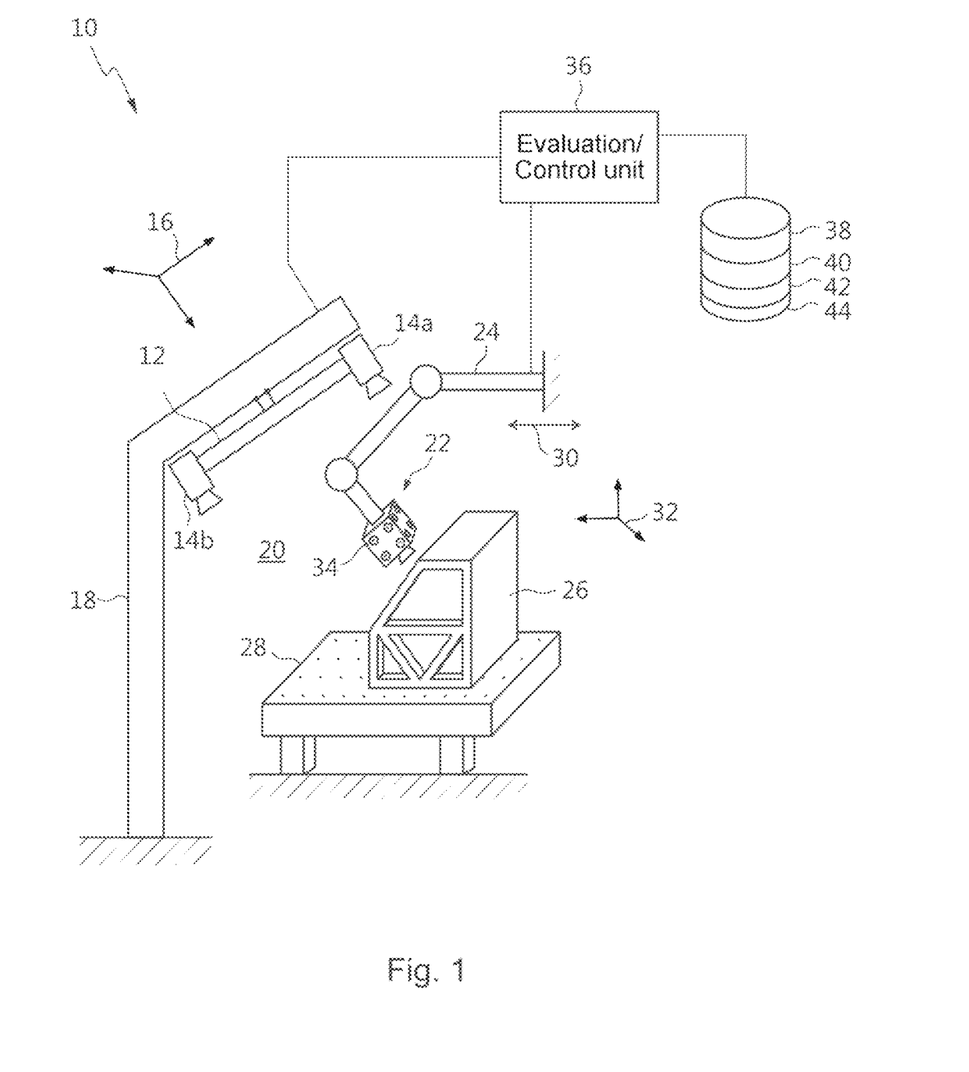
FIG. 1 shows a simplified illustration of an exemplary embodiment of an apparatus for determining dimensional and/or geometric properties of a measurement object.

In FIG. 1, an exemplary embodiment of the novel apparatus is designated in its entirety by reference numeral 10.

The apparatus 10 includes a 3D target tracking system 12, which has a plurality of cameras 14a, 14b in this exemplary embodiment. The 3D target tracking system 12 is configured to determine a respectively current pose (position and/or orientation) of a target object in space relative to a reference coordinate system 16. The 3D target tracking system 12 is therefore one example of a third measurement arrangement in terms of the invention. In a departure from the illustration in FIG. 1, in further exemplary embodiments, the third measurement arrangement may include one camera or more than two cameras and/or other target tracking sensors, such as, by way of example, LIDAR (Light Detecting and Ranging) sensors and/or sensors that follow the movement of a target object with the aid of their own movements. Furthermore, in further exemplary embodiments, the third measurement arrangement can be wholly or partly integrated in the target object and determine a respectively current pose of the target object in space for example on the basis of photogrammetrically calibrated marks and/or on the basis of some other external reference system, such as, for instance, a known 3D structure in space. In the preferred exemplary embodiments, the 3D target tracking system 12 yields measurement values which unambiguously define a respectively current pose of the target object in space.

Here the cameras 14a, 14b are mounted on a frame 18 and directed at a measurement volume 20, in which a housing body 22 as target to be tracked is arranged in a movable manner. The housing body 22 includes a first measurement arrangement and a second measurement arrangement, which are described in greater detail below in an exemplary embodiment with reference to FIGS. 2 and 3. As mentioned, in further exemplary embodiments, the housing body 22 could wholly or partly include a third measurement arrangement, which unambiguously defines a respectively current pose of the housing body in space.

The housing body 22 here is arranged on an articulated arm 24 and can be moved in an automated manner relative to a measurement object 26 with the aid of the articulated arm 24. In some exemplary embodiments, the articulated arm 24 can be a multi-axis robot configured to position the housing body 22 at a multiplicity of spatial positions within the measurement volume 20 and/or in a multiplicity of orientations relative to the measurement object 26. In the exemplary embodiment illustrated, the measurement object 26 is arranged on a workpiece table 28. The articulated arm 24 can be movable relative to the workpiece table 28 along one or more linear axes, which is illustrated in a simplified manner here by a double-headed arrow 30. In further exemplary embodiments, the measurement object 26 may be arranged on a conveying device, such as a conveyor belt (not illustrated here), for instance, which moves relative to the frame 16 and/or the articulated arm 24. The measurement object 26 may have a known 3D structure which makes it possible for the third measurement arrangement to determine a current pose of the housing body relative to the measurement object 26. The known structure can be provided to the third measurement arrangement in the form of CAD data.

In a departure from the illustration in FIG. 1, in further exemplary embodiments, the housing body 22 can be manually guided, in particular can be a scanning head held in one hand by an operator, as is described below with reference to FIGS. 2 and 3.

The first measurement arrangement in the housing body 22 defines a sensor coordinate system 32 and records (first) measurement values representing the respective position of first measurement points on the measurement object relative to the sensor coordinate system 32. The sensor coordinate system 32 can be a 2D coordinate system or a 3D coordinate system. Together with the (third) measurement values of the 3D target tracking system 12, the apparatus 10 provides 6D information concerning the selected/scanned measurement points relative to the reference coordinate system 16 or a further coordinate system (not illustrated here), such as a measurement object coordinate system, for instance. It is known to those of relevant skill in the art that the coordinate systems mentioned can be transformed into one another with the aid of suitable coordinate transformations. The suitable coordinate transformations are usually determined in the context of a calibration of the apparatus 10.

In some exemplary embodiments, defined target marks 34 are arranged on the housing body 22 such that it is possible to detect the target marks 34 within the measurement volume 20 with the aid of the 3D target tracking system 12. One or more target marks 34 may be arranged on a plurality of housing sides of the housing body 22, as is illustrated by way of example in FIG. 1. In some preferred exemplary embodiments, the target marks are embodied in accordance with EP 3 321 883 A1, cited in the introduction. In various implementations, the 3D target tracking system 12 operates according to a method as described in EP 3 321 883 A1. In other exemplary embodiments, the target marks may include retroreflectors that reflect a light beam emitted by the third measurement arrangement back to its emitter. In further exemplary embodiments, the target marks may include light sources, in particular in the form of one or more LEDs, wherein these light sources provide a light signal that can be used to determine the pose of the housing body in the measurement volume 20 on the basis of camera images.

The apparatus 10 further includes an evaluation unit 36, which, in some exemplary embodiments, can be configured, in addition to the processing of the first, second and third measurement results, also to control the movement of the housing body 22 relative to the measurement object 26 in an automated manner with the aid of the articulated arm 24. In other exemplary embodiments, the function of the evaluation unit 36 can be limited to the processing of the first, second and third measurement results, particularly if the first and second measurement arrangements with the housing body 22 are manually guided. Advantageously, the evaluation unit 36 controls and coordinates the recording of the first, second and third measurement values by the first, second and third measurement arrangements. Accordingly, in some exemplary embodiments, the evaluation unit 36 can generate one or more trigger signals (not illustrated here) which are fed to the first, second and/or third measurement arrangement and trigger the recording of the respective measurement values.

In some exemplary embodiments, the evaluation and control unit 36 may include a commercially available personal computer that operates with a commercially available operating system, such as Microsoft Windows, macOS, OSX, or Linux, for instance. Alternatively or in addition, the evaluation unit 36 may include a CNC robot controller and/or a programmable logic machine controller. The evaluation and control unit 36 may include a plurality of evaluation and/or control units coupled to one another via a suitable communication network such as, for instance, Ethernet, EtherCAT, Profinet, Devicenet or the like.

The evaluation and control unit 36 has a storage unit and/or is coupled to a storage unit in which an evaluation and/or control program 38 is stored. Furthermore, the storage unit can temporarily and/or permanently store the first measurement values 40 from the first measurement arrangement, the second measurement values 42 from the second measurement arrangement and the third measurement values 44 from the 3D target tracking system 12.

Figure 2:
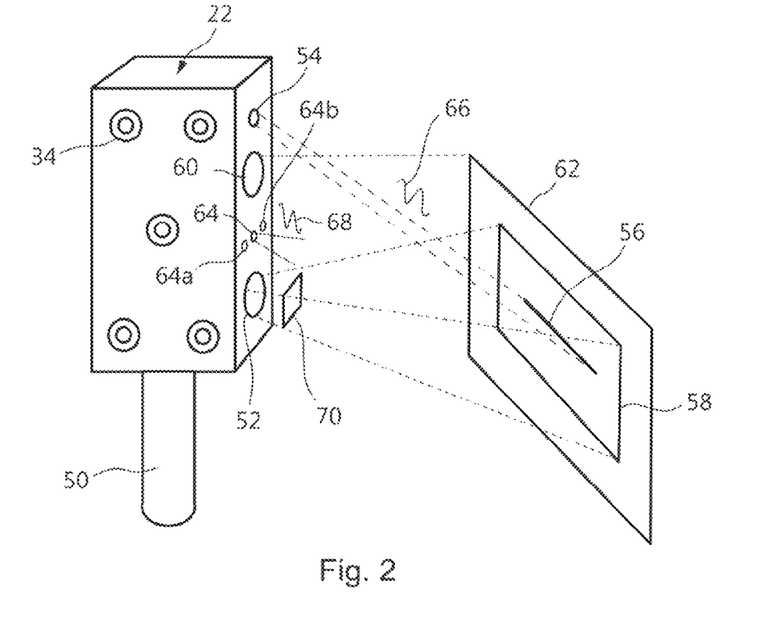
FIG. 2 shows a simplified illustration of an exemplary embodiment for a housing body which is movable relative to a measurement object and in which a first measurement arrangement and a second measurement arrangement are integrated.

FIG. 2 shows an exemplary embodiment of a manually guided scanning head with a first measurement arrangement and an integrated second measurement arrangement in a simplified illustration. Same reference signs designate the same elements as before.

The scanning head has a housing body 22, which here is connected to a handle 50. The design of the housing body 22 and of the handle 50 can deviate from the illustration in FIG. 2 and can be optimized in particular with regard to ergonomics for operator guidance. Instead of the handle 50, in other exemplary embodiments, the scanning head could have a mechanical interface (not illustrated here) via which the scanning head can be secured to the articulated arm 24 in a releasable manner. In some exemplary embodiments, the scanning head can have both a handle 50 and an interface for securing to an articulated arm 24, with the result that the scanning head can optionally be moved in a manually guided manner or in an automated manner.

In the exemplary embodiment shown, the scanning head has a first camera 52 and a projector 54, which together form a first measurement arrangement. The projector 54 here is configured to project a laser line 56 onto a measurement object surface (not illustrated here). The camera 52 is configured to record an image of the measurement object surface with the laser line 56. In FIG. 2, the image capture region of the camera 52 is designated by reference numeral 58. In some exemplary embodiments, the image capture region 58 may be restricted very closely to the laser line 56. In other exemplary embodiments, the image capture region 58 may comprise a surrounding region around the laser line 56, as is illustrated in FIG. 2. In further exemplary embodiments, the projector 54 can generate a plurality of laser lines (not illustrated here) which run parallel to one another and/or in a crossed manner with respect to one another. In these exemplary embodiments, it is preferred if the image capture region 58 can record all projected laser lines in an image.

The second measurement arrangement here includes a second camera 60 having an image capture region 62, and a point light source 64. In the exemplary embodiment illustrated, the sensor head has three point light sources 64, 64a, 64b, which are arranged next to one another parallel to the laser line 56. With the aid of the point light sources 64, 64a, 64b, the sensor head can illuminate the measurement object surface in a pose from different directions. In addition, the sensor head can illuminate the measurement object surface from different directions as soon as it is moved relative to the measurement object. The second camera 60 is used to record images of the measurement object surface with the different illuminations and, with the aid of the photometric stereo method, the evaluation unit 36 can determine surface normals from the different illumination images, as is illustrated in the publications cited in the introduction. The arrangement of a plurality of point light sources 64, 64a, 64b parallel to the laser line 56 makes it possible, in particular, to increase the measurement resolution of the first measurement arrangement on the laser line 56 with the aid of the (second) measurement values of the second measurement arrangement.

In some exemplary embodiments, the image capture region 62 of the second measurement arrangement is larger than the image capture region 58 of the first measurement arrangement. In other exemplary embodiments (not illustrated here), the image capture regions of the first and second cameras may be identical. In principle, it is possible for the first measurement arrangement and the second measurement arrangement to use a common camera, for instance the camera 60.

In the preferred exemplary embodiment, camera 60 is embodied as an area camera. In some exemplary embodiments, camera 52 can be embodied as a line camera, even though the camera 52 is also embodied as an area camera in preferred exemplary embodiments.

In some exemplary embodiments, projector 54 projects the laser line 56 with a light wavelength 66 that differs from the light wavelength 68 of the point light source 64, 64a. In these exemplary embodiments, the cameras 52, 60 preferably each have a bandpass filter tuned to the corresponding light wavelength 66 and 68, respectively. For reasons of clarity, in FIG. 2 only one bandpass filter 70 is indicated symbolically in front of the camera 52. As is known to those of relevant skill in the art, corresponding bandpass filters may be realized for example by means of a coating of the respective camera optical units and/or by means of suitable optical filter elements in the respective beam path of the cameras 52, 60.

In all preferred exemplary embodiments, the first measurement arrangement, that is to say here the camera 52 and the projector 54, and the second measurement arrangement, that is to say here the camera 60 and the point light sources 64, 64a, 64b, are held spatially fixedly relative to one another on the housing body 22. In the preferred exemplary embodiments, the position of the first measurement arrangement relative to the second measurement arrangement is determined individually with the aid of calibration and corresponding calibration values (not illustrated here) are stored in the storage unit of the evaluation unit 36 and/or in a storage unit of the scanning head. Accordingly, it is possible to combine the first measurement values of the first measurement arrangement and the second measurement values of the second measurement arrangement in a pose of the scanning head positionally correctly in relation to the object points respectively detected on the measurement object. With the aid of the third measurement values from the 3D target tracking system 12, moreover, first measurement values and second measurement values recorded at different points in time and from different poses can be combined positionally correctly in relation to the actual measurement points on the measurement object.

Figure 3:
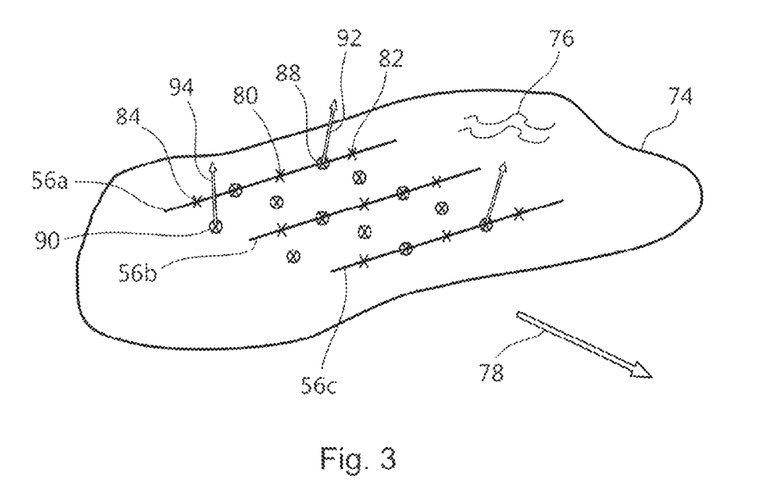
FIG. 3 shows a simplified illustration of the object surface of a measurement object with a plurality of measurement points for elucidating a preferred exemplary embodiment of the novel apparatus.

In FIG. 3, a part from the surface of a measurement object is designated by reference numeral 74. The measurement object surface 74 may have a texture 76, for example in the form of a roughness and/or as color, which influences the reflection behavior of the measurement object surface 74.

Three laser lines 56a, 56b, 56c are illustrated here on the measurement object surface 74, the laser lines being offset parallel to one another in the direction of an arrow 78. The arrow 78 symbolizes a direction of movement in which the scanning head from FIG. 2 is moved relative to the measurement object surface 74. The laser lines 56a, 56b, 56c symbolize the respective position of the laser line 56 at different image recording times with the camera 52.

Reference numerals 80, 82, 84 designate three first measurement points on the measurement object surface 74. The measurement points 80, 82, 84 lie on the laser line 56a and the apparatus 10 is able to determine, for each of the measurement points 80, 82, 84, first measurement values using the known spatial arrangement of the first camera 52 and the pattern projector 54 and also using trigonometrical relationships in accordance with FIG. 2. The exact method is known to those of relevant skill in the art from known laser scanners that operate with a laser line. It is furthermore known to those skilled in the art that the resolution of the camera 52 along the laser line 56 determines the "density" of the measurement points 80, 82, 84 along the laser line 56.

Further first measurement points corresponding to the measurement points 80, 82, 84 are illustrated along the laser lines 56b, 56c recorded later in time. In the direction 78 of movement, the resolution of the first measurement arrangement is dependent on the so-called image refresh rate, i.e. on the rate at which the first camera 52 can record successive images of the laser line 56 during the movement of the scanning head.

Reference numerals 88, 90 indicate two second measurement points, at which second measurement values were recorded with the aid of the second measurement arrangement. Reference numerals 92, 94 designate two arrows, each symbolizing a surface normal to the corresponding measurement point 88, 90. Each surface normal is a vector which, at the corresponding measurement point, is perpendicular to the object surface 74 and therefore represents a local inclination of the object surface at the corresponding measurement point. In the preferred exemplary embodiment, the surface normals 90, 92 are determined from a plurality of images of the object surface with different illuminations according to the photometric stereo method.

As is illustrated in FIG. 3, the second measurement arrangement can be used to measure second measurement points 88, 90 on the object surface 74 which lie between the first measurement points 80, 82, 84, specifically both along the laser line 56 and between temporally successive laser line images. Accordingly, with the aid of the second measurement arrangement, the measurement resolution of the apparatus 10 can be increased in comparison with an apparatus that operates solely with a laser line scanner. Alternatively or in addition, the measurement speed at which the scanning head is moved relative to the measurement object surface 74 may be increased for the same image refresh rate of the first camera 52. Furthermore, the texture 76 of the object surface can be determined with the aid of the surface normals.

The phrase at least one of A, B, and C should be construed to mean a logical (A OR B OR C), using a non-exclusive logical OR, and should not be construed to mean "at least one of A, at least one of B, and at least one of C."

What is claimed is:

1. An apparatus for determining at least one of dimensional and geometric properties of a measurement object, the apparatus comprising:
    a housing body that is movable relative to the measurement object;
    a first measurement arrangement arranged on the housing body, wherein the first measurement arrangement defines a first coordinate system and is configured to record first measurement values;
    a second measurement arrangement arranged on the housing body, wherein the second measurement arrangement is configured to record second measurement values;
    a third measurement arrangement that defines a further coordinate system and is configured to record third measurement values; and
    an evaluation unit that is configured to determine the at least one of the dimensional and geometric properties of the measurement object using the first measurement values, the second measurement values, and the third measurement values, wherein:
    the first measurement values represent respective positions of first selected measurement points on the measurement object relative to the first coordinate system,
    the second measurement values represent respective surface normals to second selected measurement points on the measurement object,
    the housing body holds the first measurement arrangement and the second measurement arrangement in a spatially fixed relationship with respect to one another,
    the third measurement values represent a respective current pose of the housing body relative to the further coordinate system,
    the evaluation unit is configured to combine the first measurement values and the second measurement values positionally correctly using the third measurement values,
    the first measurement arrangement comprises a light pattern projector,
    the second measurement arrangement comprises a point light source, and
    the first measurement arrangement and the second measurement arrangement together comprise and share a common camera.

2. An apparatus for determining at least one of dimensional and geometric properties of a measurement object, the apparatus comprising:
    a housing body that is movable relative to the measurement object;
    a first measurement arrangement arranged on the housing body, wherein the first measurement arrangement defines a first coordinate system and is configured to record first measurement values;

a second measurement arrangement arranged on the housing body, wherein the second measurement arrangement is configured to record second measurement values;

a third measurement arrangement that defines a further coordinate system and is configured to record third measurement values; and an evaluation unit that is configured to determine the at least one of the dimensional and geometric properties of the measurement object using the first measurement values, the second measurement values, and the third measurement values, wherein:

the first measurement values represent respective positions of first selected measurement points on the measurement object relative to the first coordinate system, the second measurement values represent respective surface normals to second selected measurement points on the measurement object, the housing body holds the first measurement arrangement and the second measurement arrangement in a spatially fixed relationship with respect to one another, the third measurement values represent a respective current pose of the housing body relative to the further coordinate system, the evaluation unit is configured to combine the first measurement values and the second measurement values positionally correctly using the third measurement values, the first measurement arrangement comprises a light pattern projector and a first camera, the first camera is arranged in a defined pose relative to the light pattern projector on the housing body, the second measurement arrangement comprises a point light source and a second camera, and the second camera is arranged in a defined pose relative to the point light source on the housing body.

3. The apparatus of claim 2, wherein:
the light pattern projector is configured to radiate a light pattern having a first wavelength and
the first camera has a first bandpass filter tuned to the first wavelength.

4. The apparatus of claim 2, wherein the second measurement arrangement is configured to sequentially record a plurality of camera images each showing the measurement object respectively illuminated by the point light source from a different direction.

5. The apparatus of claim 2, wherein:
the point light source is configured to radiate light having a second wavelength;
the second wavelength is different from a first wavelength radiated from the first measurement arrangement; and
the second camera has a second bandpass filter tuned to the second wavelength.

6. The apparatus of claim 2, wherein:
the light pattern projector is configured to project a laser line onto the measurement object and
the second measurement arrangement comprises a plurality of point light sources that are arranged along a line parallel to the laser line.

7. The apparatus of claim 1, wherein the common camera is a color camera.

8. The apparatus of claim 1, wherein:
the light pattern projector is configured to project a laser line onto the measurement object and
the second measurement arrangement comprises a plurality of point light sources that are arranged parallel to the laser line.

9. The apparatus of claim 1, wherein the third measurement arrangement is synchronized with the first measurement arrangement and with the second measurement arrangement.

10. The apparatus of claim 1, wherein the first measurement arrangement and the second measurement arrangement are configured to record the respective first and second measurement values temporally synchronously with respect to one another.

11. The apparatus of claim 1, wherein the first measurement arrangement and the second measurement arrangement are configured to record the respective first and second measurement values asynchronously with respect to one another.

12. The apparatus of claim 1, wherein:
the first measurement arrangement generates the first measurement values with a defined spatial resolution and
the evaluation unit is configured to interpolate first measurement values spaced apart from one another using the second measurement values.

13. The apparatus of claim 1, wherein the evaluation unit is configured to correct selected first measurement values using the second measurement values.

14. The apparatus of claim 1, wherein:
the measurement object has an object surface having a surface texture and
the evaluation unit is configured to determine the surface texture of the measurement object using the second measurement values.

15. The apparatus of claim 1, wherein the third measurement arrangement is configured to track the housing body during movement relative to the measurement object.

16. The apparatus of claim 1, wherein the third measurement arrangement comprises a plurality of cameras configured to track the housing body.

17. The apparatus of claim 1, wherein defined target marks are arranged on the housing body.

* * * * *